(12) United States Patent
Maeda et al.

(10) Patent No.: US 11,321,585 B2
(45) Date of Patent: May 3, 2022

(54) IMAGING DEVICE AND MORPHOLOGICAL FEATURE DATA DISPLAY METHOD

(71) Applicant: Hitachi High-Technologies Corporation, Tokyo (JP)

(72) Inventors: Yaku Maeda, Tokyo (JP); Akira Ikeuchi, Tokyo (JP); Shigeru Kawamata, Tokyo (JP); Hiromi Mise, Tokyo (JP); Akira Sawaguchi, Miyazaki (JP)

(73) Assignee: Hitachi High-Tech Corporation, Tokyo (JP)

( * ) Notice: Subject to any disclaimer, the term of this patent is extended or adjusted under 35 U.S.C. 154(b) by 265 days.

(21) Appl. No.: 16/604,918

(22) PCT Filed: Apr. 14, 2017

(86) PCT No.: PCT/JP2017/015223
§ 371 (c)(1),
(2) Date: Oct. 11, 2019

(87) PCT Pub. No.: WO2018/189875
PCT Pub. Date: Oct. 18, 2018

(65) Prior Publication Data
US 2020/0125894 A1    Apr. 23, 2020

(51) Int. Cl.
*G06K 9/62*    (2006.01)
*G06K 9/00*    (2022.01)

(52) U.S. Cl.
CPC ....... *G06K 9/6254* (2013.01); *G06K 9/00147* (2013.01); *G06K 9/6284* (2013.01)

(58) Field of Classification Search
None
See application file for complete search history.

(56) References Cited

U.S. PATENT DOCUMENTS 7,409,081 B2 *  8/2008  Ogi ............... G06T 7/0004
                                           382/144
9,542,591 B2 *  1/2017  Moussavi ........ G06K 9/6277
(Continued)

FOREIGN PATENT DOCUMENTS

JP    2001-156135 A    6/2001
JP    2003-317082 A    11/2003
(Continued)

OTHER PUBLICATIONS

Japanese-language Office Action issued in Japanese Application No. 2019-512139 dated Dec. 1, 2020 with English translation (six (6) pages).

(Continued)

*Primary Examiner* — Anand P Bhatnagar
(74) *Attorney, Agent, or Firm* — Crowell & Moring LLP

(57) ABSTRACT

Provided is an image classification device that facilitates efficient creation of teacher data and comprehensive evaluation on a basis of knowledge and experience of the user. The image classification device includes: an image input unit that acquires an image; an image display unit that displays the image acquired by the image input unit; an image analysis unit that calculates a feature amount from the acquired image; a feature amount display unit that displays the calculated feature amount; an extraction and sorting condition input unit that specifies an extraction and sorting condition with regard to the feature amount; an extraction and sorting processing unit that performs extraction and sorting processing based on the condition; an extraction and sorting processing result display unit that displays a result; an user classification input unit that allows a user to input a classification destination with regard to the image; and a user classification result display unit that displays an classification input content.

18 Claims, 7 Drawing Sheets

(56) References Cited

U.S. PATENT DOCUMENTS

| | | | |
|---|---|---|---|
| 9,607,202 B2* | 3/2017 | Sammak | G06K 9/00147 |
| 10,304,188 B1* | 5/2019 | Kumar | G06K 9/00127 |
| 10,445,876 B2* | 10/2019 | Nieves Alicea | G06K 9/0014 |
| 10,565,429 B2* | 2/2020 | Chukka | G06K 9/00147 |
| 11,047,791 B2* | 6/2021 | Zahniser | G01N 15/1475 |
| 2003/0202703 A1* | 10/2003 | Ogi | G06T 7/0004 |
| | | | 382/224 |
| 2006/0274933 A1 | 12/2006 | Obara et al. | |
| 2011/0188735 A1 | 8/2011 | Hosoya et al. | |
| 2012/0100532 A1* | 4/2012 | George | G06K 9/00147 |
| | | | 435/6.1 |
| 2016/0078275 A1* | 3/2016 | Wang | G06K 9/6277 |
| | | | 382/133 |
| 2017/0081628 A1* | 3/2017 | Matsubara | C12M 23/50 |
| 2017/0243051 A1* | 8/2017 | Chukka | G06K 9/6277 |

FOREIGN PATENT DOCUMENTS

| | | |
|---|---|---|
| JP | 2011-243188 A | 12/2011 |
| JP | 2014-142871 A | 8/2014 |
| WO | WO 2010/023791 A1 | 3/2010 |
| WO | WO 2011/004568 A1 | 1/2011 |
| WO | WO 2015/182382 A1 | 12/2015 |

OTHER PUBLICATIONS

International Search Report (PCT/ISA/210) issued in PCT Application No. PCT/JP2017/015223 dated Jul. 11, 2017 with English translation (five (5) pages).

Japanese-language Written Opinion (PCT/ISA/237) issued in PCT Application No. PCT/JP2017/015223 dated Jul. 11, 2017 (six (6) pages).

* cited by examiner

[FIG. 1]
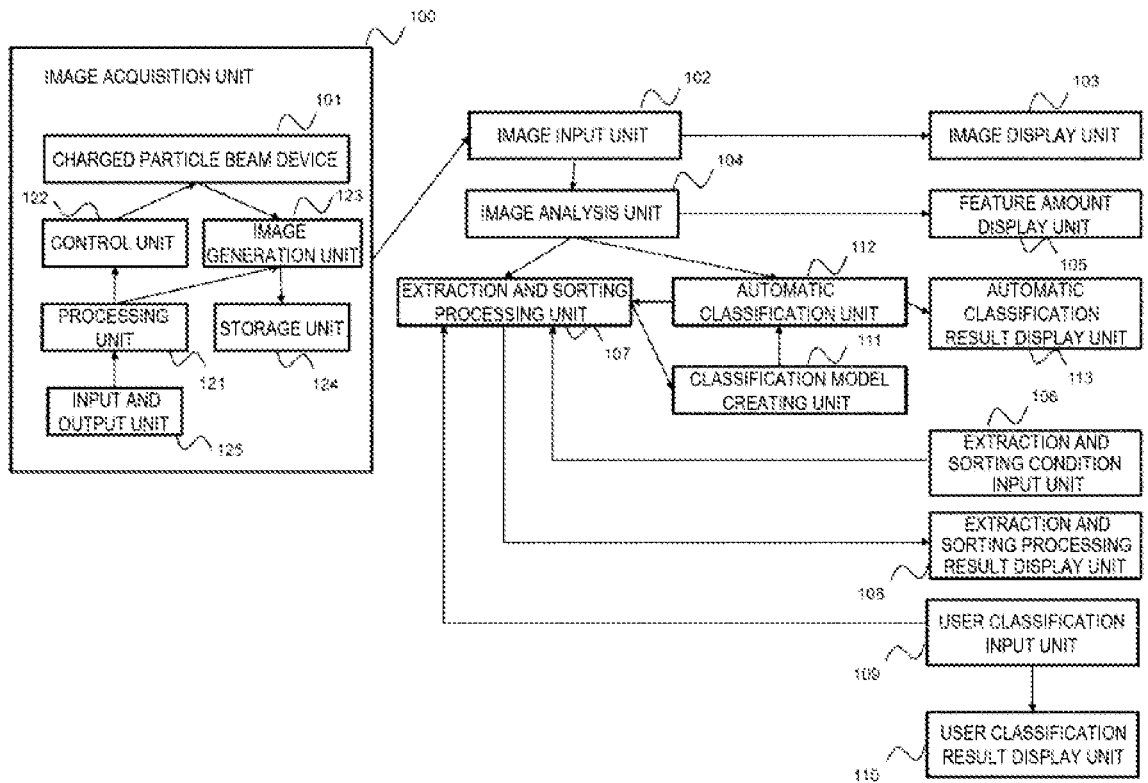
[FIG. 2]
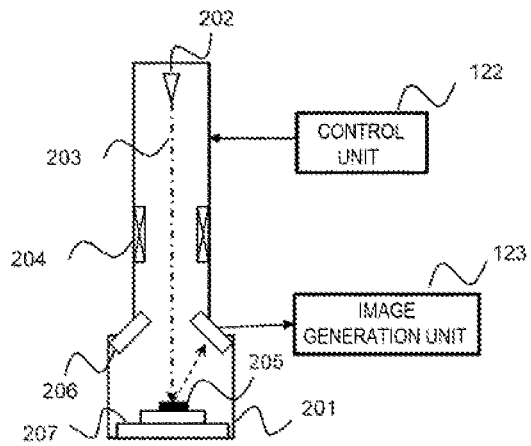

[FIG. 3]
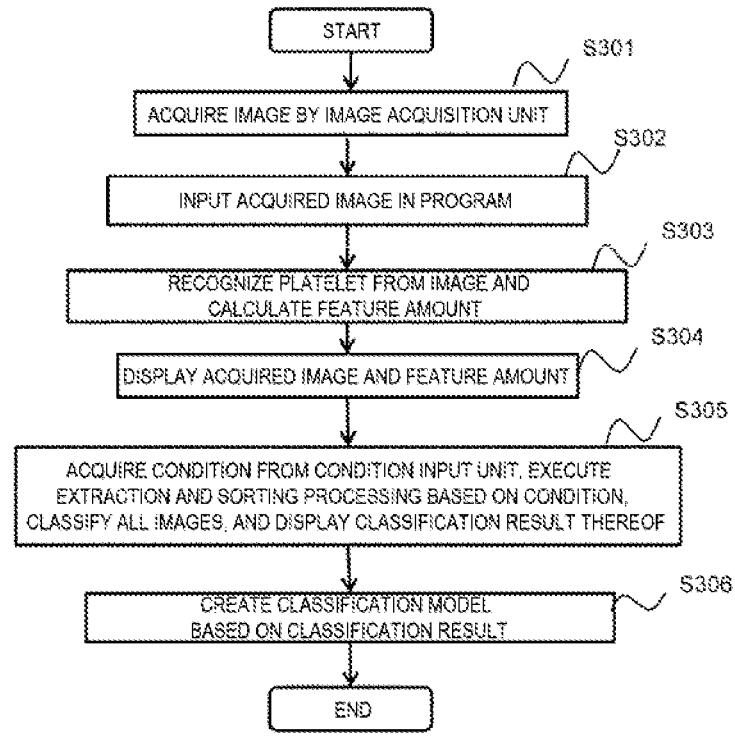
[FIG. 4]
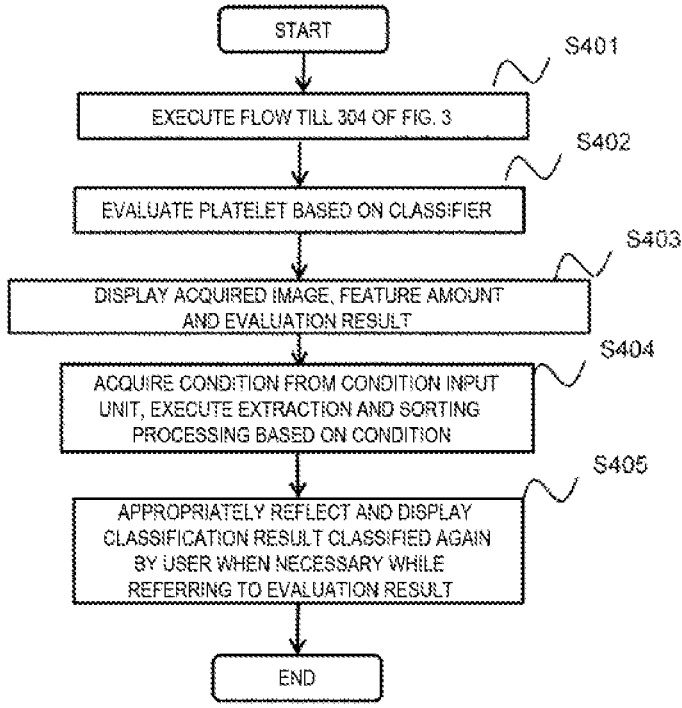

[FIG. 5]
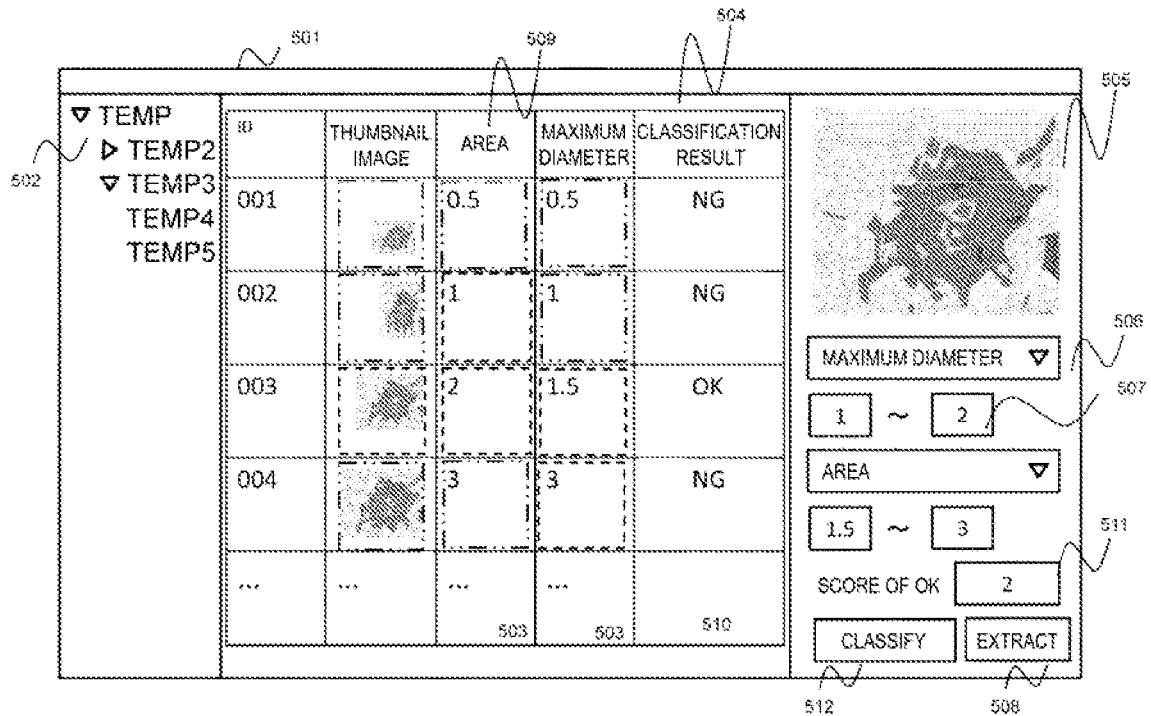
[FIG. 6]
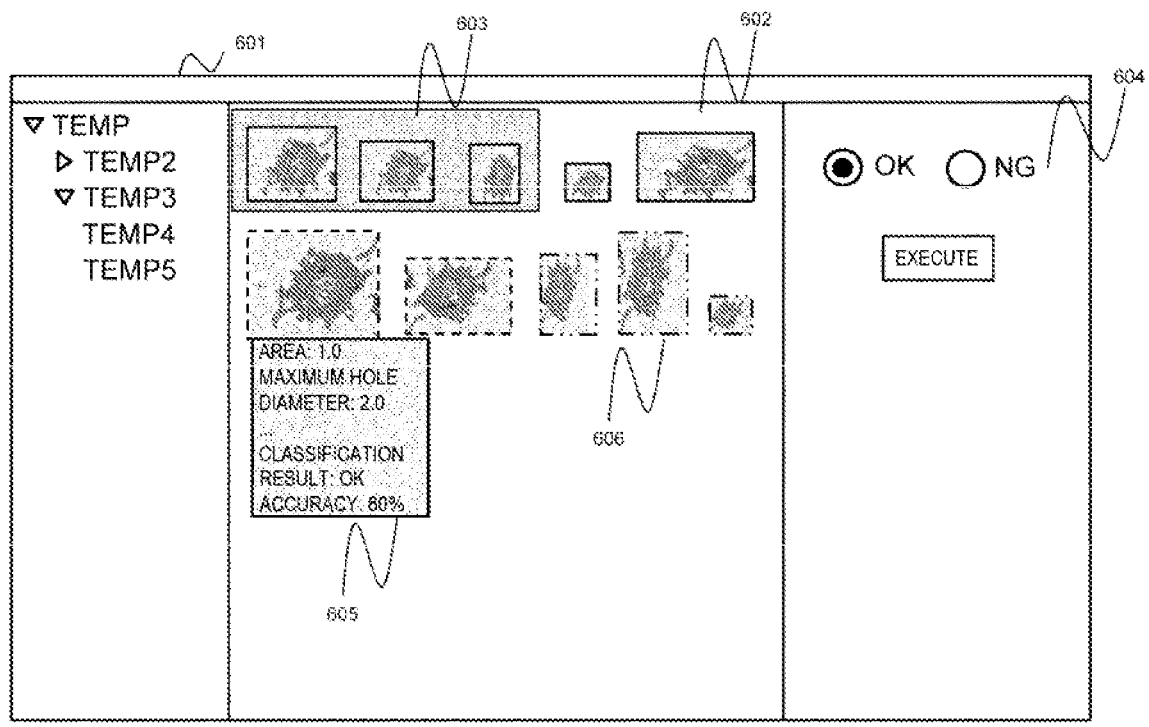

[FIG. 7]
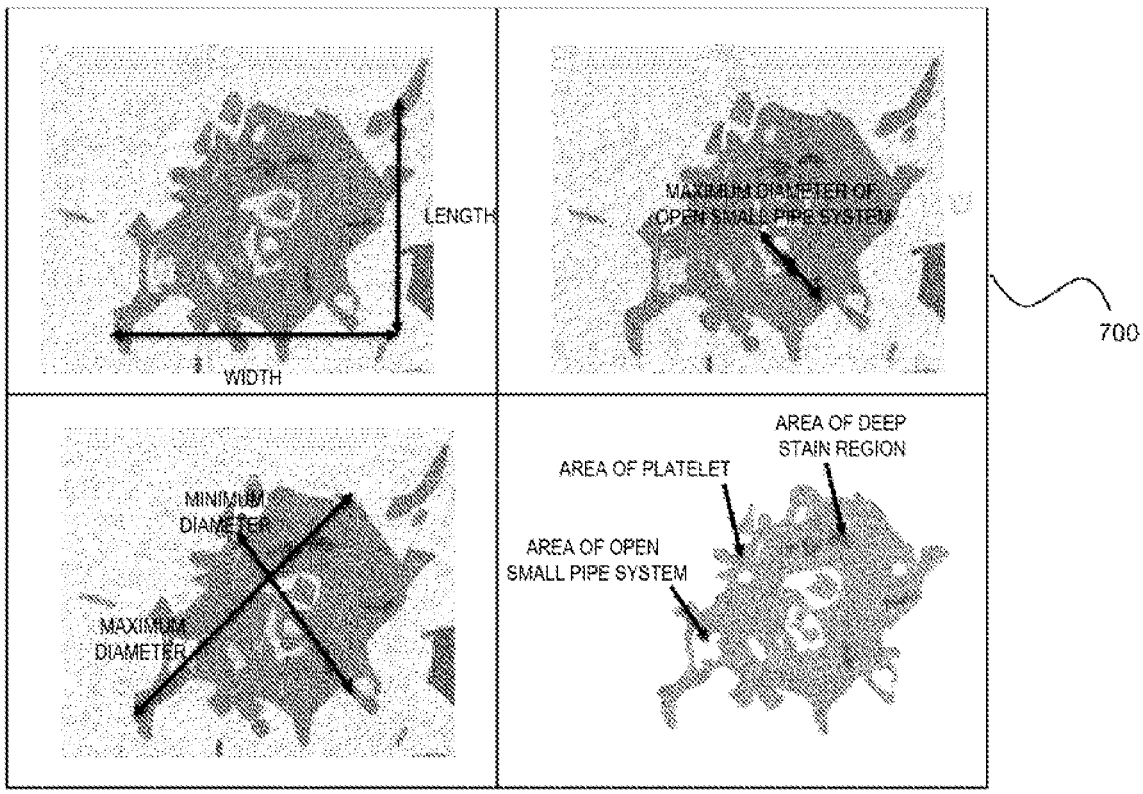
[FIG. 8]
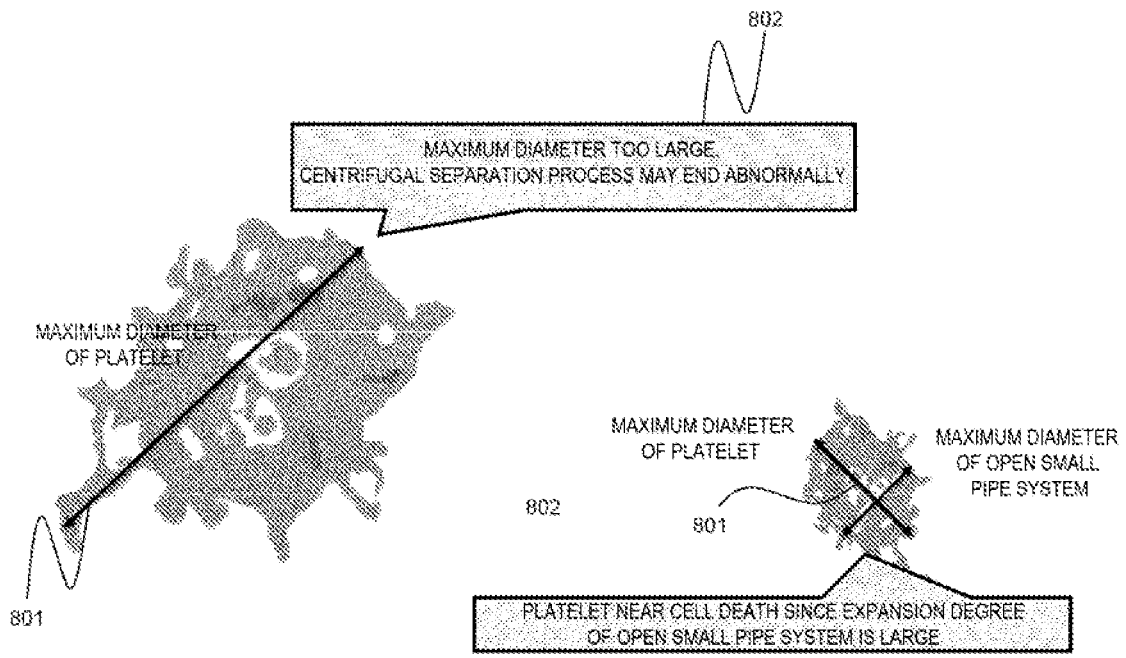

[FIG. 9]
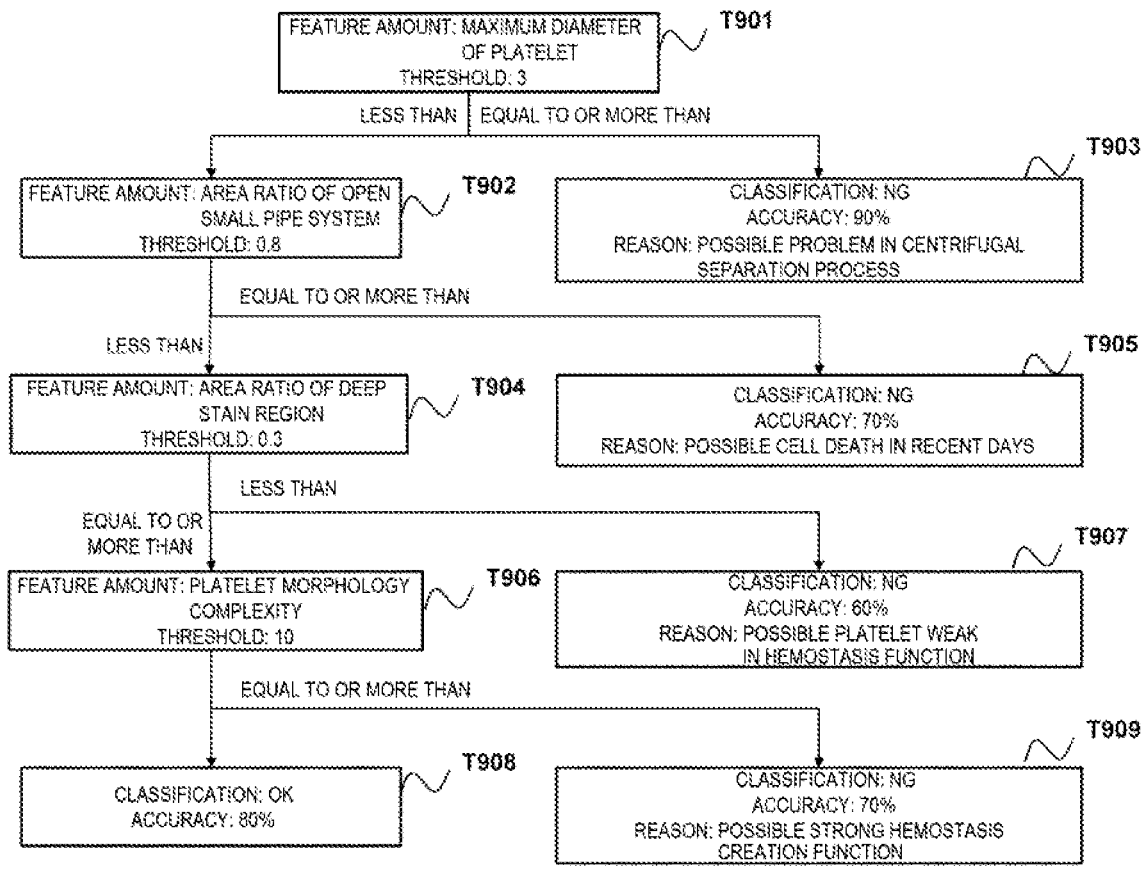
[FIG. 10]
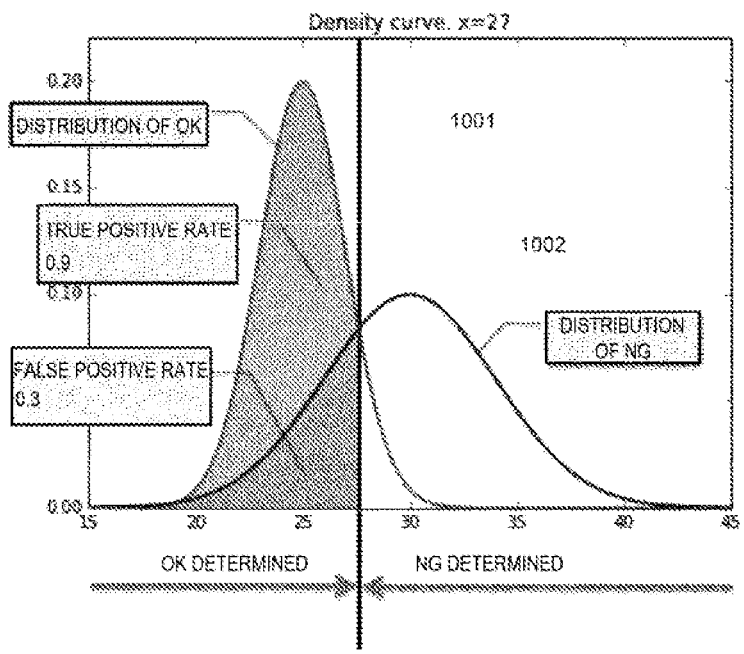

[FIG. 11]

| ▽ TEMP<br>▷ TEMP2<br>▽ TEMP3<br>　TEMP4<br>　TEMP5 | ID | THUMBNAIL IMAGE | AREA ▽▲ | ... | "CLASSIFICATION MODEL" CLASSIFICATION RESULT | "USER" CLASSIFICATION RESULT |
|---|---|---|---|---|---|---|
| | 001 | | 1 | ... | OK | OK |
| | 002 | | 2 | ... | OK | OK |
| | 003 | | 10 | ... | OK | NG |
| | 004 | | 12 | ... | NG | NG |
| | ... | ... | ... | ... | ... | ... |

[FIG. 12A]

| ▽ TEMP<br>▷ TEMP2<br>▽ TEMP3<br>　TEMP4<br>　TEMP5 | ID | THUMBNAIL IMAGE | AREA ▽▲ | EXPANSION DEGREE OF OPEN SMALL PIPE SYSTEM | CLASSIFICATION RESULT | SORT TARGET FEATURE AMOUNT<br>AREA |
|---|---|---|---|---|---|---|
| | 001 | | 1 | 0.2 | OK | INFORMATION GAIN<br>0.13 |
| | 002 | | 3 | 0.6 | NG | |
| | 003 | | 5 | 0.1 | OK | THRESHOLD VALUE WHEN CLASSIFICATION RESULT SEPARATION DEGREE IS MAXIMUM (INFORMATION GAIN) |
| | 004 | | 12 | 0.8 | NG | - |
| | ... | ... | ... | ... | | |

[FIG. 12B]
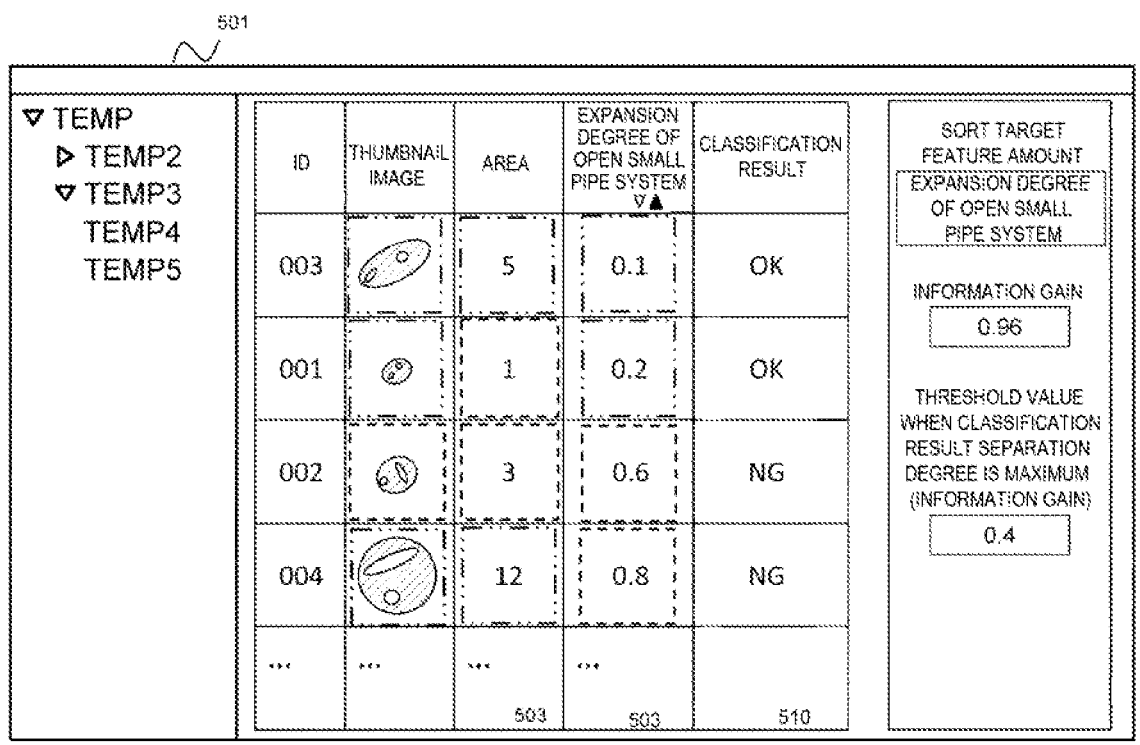

IMAGING DEVICE AND MORPHOLOGICAL FEATURE DATA DISPLAY METHOD

TECHNICAL FIELD

The present invention relates to an image classification device, and particularly relates to a display technique of image classification processing based on a classification model created by analyzing a feature amount of an imaged image.

BACKGROUND ART

There has been proposed a method for evaluating a state of a cell by imaging a specific cell (differentiated cell) produced by culturing, differentiating, and introducing an undifferentiated pluripotent stem cell represented by an artificial pluripotent stem (iPS) cell or an embryonic stem (ES) cell with a microscope and capturing characteristics of the image.

For example, in PTL 1, an image of a cell group is acquired, each individual cell is recognized from the cell group, and whether the cell is in an undifferentiated state or in a differentiated state is evaluated from morphological features such as circularity, a maximum diameter, a minimum diameter, and an area of each individual cell. In addition, PTL 2 describes a method of extracting a desired cell from an image of a cell group, in which a feature amount that is not obtained only from an outer contour of a cell, such as a ratio of an open area to an area of the cell, is also used as a morphological feature amount for classifying cells. In PTL 1 and PTL 2, once a classifier is created based on a classification model or learning by using a classification model based on a threshold, machine learning, and the like, classification is performed automatically without user intervention.

In addition, PTL 3 describes a method for creating teacher data for machine learning, in which a user can easily determine suitability of a classification model by displaying an image and a classification result and accuracy based on initial classification and a classification model side by side classification.

PRIOR ART LITERATURE

Patent Literature

PTL 1: WO2015/182382
PTL 2: JP-A-2011-243188
PTL 3: JP-A-2014-142871

SUMMARY OF INVENTION

Technical Problem

As described above, in the related art, the classification of differentiated and undifferentiated state of cells according to morphological features of the outer contour and the internal structure of the cells and other classifications related to the cells are performed automatically, and the results are displayed. However, there is no disclosure of a method of creating initial classification data that is necessary for the teacher data for classification or a method of reclassifying a determination result of the created classification model by the user.

For medical purposes, the automatic classification results determined by the classification model generated by machine learning or the like cannot be trusted and used entirely, and finally a determination is made based on knowledge and experience of a specialist. Therefore, it is desirable to propose a method for the specialist to perform classification and evaluation efficiently when creating the initial classification data necessary for the teacher data and performing a final evaluation on the results of the classification model.

Based on the above problems, the object of the invention is to provide an image classification device, a display method thereof, and a program capable of efficiently performing creation of necessary initial classification data and evaluation of results of a classification model.

Solution to Problem

In order to achieve the above object, the invention provides an image classification device which includes: an image input unit that acquires an image; an image display unit that displays the acquired image; an image analysis unit that calculates a morphological feature amount from the image; a feature amount display unit that displays the calculated feature amount; an extraction and sorting condition input unit that specifies an extraction and sorting condition with regard to the calculated feature amounts; an extraction and sorting processing unit that performs extraction and sorting processing based on the input condition from the extraction and sorting condition input unit; an extraction and sorting processing result display unit that displays a processing result of the extraction and sorting processing unit; an user classification input unit that allows a user to input a classification destination with regard to the image; and a user classification result display unit that displays an input content from the user classification input unit.

In addition, in order to achieve the above object, the invention provides a display method of an image classification device including an analysis classification unit and a display unit. The analysis classification unit calculates a feature amount of a form from the acquired image, and performs extraction and sorting processing of the feature amount based on an extraction and sorting condition specified with regard to the calculated feature amount. The display unit displays the acquired image, displays the calculated feature amount, displays processing results of extraction and sorting processing of the feature amount, and displays an input content when a user inputs a classification destination with regard to the image.

Further, in order to achieve the above object, the invention provides a program that is executed by an image classification device including an analysis classification unit and a display unit. The analysis classification unit is allowed to calculate a feature amount of a form from the acquired image, and perform extraction and sorting processing of the feature amount based on an extraction and sorting condition specified with regard to the calculated feature amount. The display unit is allowed to display the acquired image, display the calculated feature amount, display processing results of extraction and sorting processing of the feature amount, and display an input content when a user inputs a classification destination with regard to the image.

Advantageous Effect

According to the invention, the initial classification of teacher data and the like can be efficiently performed.

Further, comprehensive evaluation based on knowledge and experience of a user can be easily performed.

BRIEF DESCRIPTION OF DRAWINGS

FIG. 1 is a block diagram illustrating a schematic configuration of a platelet evaluation system according to a first embodiment.

FIG. 2 is a schematic configuration diagram of a scanning charged particle microscope used in the system according to the first embodiment.

FIG. 3 is a flowchart when teacher data and a classification model are created by the platelet evaluation system according to the first embodiment.

FIG. 4 is a flowchart for evaluating platelets by the platelet evaluation system according to the first embodiment.

FIG. 5 is a schematic view illustrating an example of a user interface of a platelet evaluation program according to the first embodiment.

FIG. 6 is a schematic view illustrating another example of the user interface of the platelet evaluation program according to the first embodiment.

FIG. 7 illustrates a display screen of a platelet image and morphological feature amounts thereof according to the first embodiment.

FIG. 8 illustrates highlight of extraction and evaluation results of each feature amount according to the first embodiment.

FIG. 9 illustrates an example of a classification model of the platelet evaluation system according to the first embodiment.

FIG. 10 illustrates an example of an ROC curve for determining validity and accuracy of the classification model according to the first embodiment.

FIG. 11 illustrates an example of a work support user interface of the platelet evaluation system according to the first embodiment.

FIG. 12A illustrates an example of a classification model creation work support according to the first embodiment.

FIG. 12B illustrates another example of the classification model creation work support according to the first embodiment.

DESCRIPTION OF EMBODIMENTS

Embodiments of the invention will be sequentially described with reference to the drawings. An object of the image classification device according to the invention is not limited to cells, and the following description of the specification focuses on a case of classifying imaged cells such as platelets.

Embodiment 1

Embodiment 1 is an embodiment of an image classification device, a display method thereof, and a program, that is, an embodiment of an image classification device, a display method thereof, and a program in which the image classification device includes an image input unit that acquires an image; an image display unit that displays the acquired image; an image analysis unit that calculates a morphological feature amount from the image; a feature amount display unit that displays the calculated feature amount; an extraction and sorting condition input unit that specifies extraction and sorting conditions with regard to the feature amount; an extraction and sorting processing unit that performs extraction and sorting processing based on the condition input from the extraction and sorting condition input unit; an extraction and sorting processing result display unit that displays the result of the extraction and sorting processing unit, an user classification input unit that allows a user to input a classification destination with regard to an image; and a user classification result display unit that displays input content from the user classification input unit.

The following description describes a case as an example in which a signal based on an image input by the image input unit is detected by a charged particle beam device. However, the invention is not limited to the charged particle beam device. The charged particle beam device according to the embodiment may be an imaging device having a function of generating an image, and includes, for example, an imaging device using an optical microscope such as a bright field microscope or a differential interference microscope, a fluorescence microscope, and X-rays other than the charged particle beam device, an imaging device based on ultrasonic, an imaging device based on nuclear magnetic resonance imaging method, a composite device of the above and a sample processing device, and an analysis and inspection device to which the above are applied.

In addition, the embodiment describes a platelet evaluation system as an example to evaluate platelets as targets which are differentiated cells differentiated and induced from pluripotent stem cells (undifferentiated cells). However, the evaluation object of the imaging device, the feature data display method, and the program according to the embodiment is not limited to platelets. That is, the evaluation object according to the embodiment may be any object that allows evaluation of good or bad and/or functionality of the object based on characteristics of the internal structure and/or the form of the object, and may include, for example, neural stem cells, cardiomyocytes, insulin-producing cells, stem cells and hematopoietic stem cells, or cells of corneas, retinas, bones, cartilages, muscles and kidneys, and even a semiconductor substrate or a semiconductor integrated circuit manufactured by using a semiconductor manufacturing process.

<Configuration of Platelet Evaluation System>

FIG. 1 is a block diagram illustrating a schematic configuration of the platelet evaluation system according to the first embodiment. As shown in FIG. 1, the platelet evaluation system of the embodiment includes an image acquisition unit 100, an image input unit 102 into which the acquired image is input, an image display unit 103 that displays the input image, an image analysis unit 104 that recognizes a platelet from the image and analyzes a morphological feature amount, a feature amount display unit 105 that displays the analyzed morphological feature amount, an extraction and sorting condition input unit 106 that arbitrarily extracts and sorts corresponding platelets from the feature amount, an extraction and sorting processing unit 107 that extracts and sorts corresponding images based on the input information, an extraction and sorting processing result display unit 108 that displays the extraction and sorting processing results, an user classification input unit 109 that allows a user to designate a classification destination, a user classification result display unit 110 that displays the classification result by the user, a classification model creating unit 111 that creates a classification model based on teacher data serving as the user classification result, an automatic classification unit 112 that classifies platelets from the feature amount using the classification model, and an automatic classification result display unit 113 that displays the automatically classified results. In addition, the image acquisition unit 100 includes a charged particle beam device 101, a processing unit 121, a control unit 122, an image generation unit 123, a storage unit 124, and an input and output unit 125.

In the specification, the image analysis unit 104, the extraction and sorting processing unit 107, the sort processing unit 107, the classification model creating unit 111 and the automatic classification unit 112 may be collectively referred to as an analysis classification unit. Similarly, the image display unit 103, the feature amount display unit 105, the sort result display unit 108, the user classification result display unit 110, and the automatic classification result display unit 113 may be collectively referred to as a display unit, and the plurality of display units may be collectively displayed on one display screen. Further, the extraction and sorting condition input unit 106 and user classification input unit 109 may be collectively referred to as an input unit, and the above may also be configured with one input unit.

FIG. 2 is a schematic configuration of the charged particle beam device 101 of the image acquisition unit 100 in FIG. 1. In FIG. 2, a scanning charged particle microscope 201 is controlled by the control unit 122, and outputs a signal detected by a detector 206 to the image generation unit 123. By generating a charged particle beam 203 from a charged particle gun 202, controlling the direction and converge of the charged particle beam 203 by passing the charged particle beam 203 to an electron lens 204, and emitting or scanning the charged particle beam, observation can be performed at an arbitrary magnification. Here, the magnification may be a width of a field of view (FOV), or a length (pixel size) indicated by one pixel in a case where a digital image is used. A plurality of the electron lenses 204 may be provided, and an electron lens that adjusts alignment, an electron lens that adjusts astigmatism, or a beam deflection electron lens used for a purpose of scanning may also be provided.

A signal is obtained by detecting particles generated from a sample 205 by a detector 206. A plurality of detectors 206 may be provided, and a detector that detects different particles such as a detector that detects electrons and a detector that detects electromagnetic waves, a detector that only detects particles whose energy or spin direction is within a specific range, or a detector that detects particles having different properties such as a secondary charged particle detector and a backscattered charged particle such as a reflected electron detector may also be provided. A plurality of detectors that detect particles of the same property may be provided at different arrangement positions. In a case where a plurality of detectors are provided, a plurality of images can usually be acquired by imaging once.

A signal acquired by the detector 206 forms an image by the image generation unit 123. The image generation unit 123 includes an image processing circuit including an A/D converter and an electric circuit such as an FPGA, and performs A/D conversion on the signal detected by the detector 206 to obtain a digital image. The generated digital image is transferred to and stored in a storage unit 124 constituted by a recording medium such as a semiconductor memory or a hard disk. The sample 205 is in contact with a stage 207, and an image at an arbitrary position of the sample can be acquired by moving the stage 207 under control of the control unit 122.

Data exchanged between the above-described configurations is processed and controlled by the processing unit 121. For example, in accordance with a voltage value input by the input and output unit 125, the processing unit 121 calculates a control value to be applied to the electron lens 204 and passes the control value to the control unit 122. The control unit 122 inputs a specified control value to the electron lens 204 in accordance with an instruction to the processing unit 121, and performs control to obtain a voltage value input by the input and output unit 125. In addition, the processing unit 121 also collects various input values and control values, and stores conditions during imaging together with the image in the storage unit 124. The imaging condition may be embedded in image data, or may also be stored as another file.

<Platelet Evaluation System Configuration and Teacher Data and Classification Model Creation Method>

FIG. 3 is a flowchart illustrating an operation when the device according to the embodiment described above is applied to the platelet evaluation system. A flow up to the acquisition of the image and the imaging condition described above is a description of step 301 in FIG. 3. Hereinafter, the operation processing will be described below with reference to the flowchart of FIG. 3.

The image acquired by the image acquisition unit 100 is input to a platelet evaluation program of the platelet evaluation system. The platelet evaluation program according to the embodiment is installed in a computer such as a PC. The computer includes a central processing unit (CPU), a storage unit such as a memory, an input and output unit such as a keyboard, a mouse, and a monitor, and operates with the program being executed by the CPU.

The computer does not necessarily have to be one computer, and may be complemented by communicating data such as images and feature amounts to a plurality of computers by a plurality of programs. Further, a part of the processing of the programs may be executed by a logic circuit such as an FPGA, a parallel processing device such as a GPU, or a distributed high-speed calculation system for the purpose of improving processing speed and reducing processing time.

An operating system (OS) is installed in the computer, and a file management program is executed. The image input unit 102 stores the acquired platelet image and imaging condition at a specific position of a storage unit such as the storage unit 124. The platelet evaluation program monitors a folder and a file at or lower than the specific position, and automatically acquires the image and the imaging condition. The user selects a specified folder from a folder tree of the program to be described below, so as to read an image group of a specific folder or a lower folder and an imaging condition for each image (step 302). The above is to facilitate management in the platelet evaluation system by taking a folder as an examination unit of a platelet product.

Although the file management program is used in the embodiment, processing of recording image data in a specific memory location may be substituted, and the image may be acquired by directly communicating between programs via the control unit 122 and the processing unit 121 of the imaging device. Further, the image input unit 102 may be provided with a user interface so that an arbitrary image selected by the user can be acquired. In any case, the image analysis unit 104 of the analysis classification unit calculates and stores the morphological feature amount of the platelet image read from the image input unit 102 (step 303).

The image analysis unit 104 performs region segmentation processing based on image processing. Contour extraction is first performed on external forms of each platelet included in the image data. The contour extraction is binarized using well-known image processing and image recognition technology such as Otsu binarization and p-tile method. Subsequently, segmentation of the binarized image data is performed, and the binarized region is divided into regions of each platelet. When a platelet sample is imaged, platelets may be imaged in an adjacent or contact state, and an aggregate of a large number of platelets may be erroneously recognized as one platelet with the above-described binarization processing only. Therefore, it is necessary to separate the platelets from the aggregate of platelets according to the segmentation processing. Specifically, the segmentation processing is performed by using, for example, a Watershed method, a pattern matching method, or a well-known image processing and image recognition technology using machine learning such as Deep Learning, so as to divide the aggregate of platelets into contour (polygon) data of each platelet.

The contour data of each platelet is calculated by the processing up to step 303 of the flowchart of FIG. 3, and the contour data corresponding to each platelet is accordingly stored in a storage device such as the storage unit 124. As a result, the contour data, which is shape data of the platelet external form, is in association with individual platelets included in the image data.

The above is an example of processing when the image analysis unit 104 extracts the external form and the contour of the individual platelets. Further, in the platelet evaluation system of the embodiment, in order to improve evaluation accuracy of the platelets, not only morphological features of the external forms and contours of the platelets but also feature amounts such as contour data of internal structures of organelles included inside the platelet such as secretory granules and open small pipe systems are calculated and stored in step 303.

The contour data of the internal structure such as the organelles is calculated by applying a contour extraction processing again to a region inside the already calculated contour data of the platelet external form. For example, in the case of calculating the contour data of the open small pipe system, all pieces of contour data of the open small pipe system included inside the platelets are collected by setting the binarization condition such that only the open small pipe system can be separated. The collected contour data of the open small pipe system is stored in association with platelets to which the open small pipe system belongs. Similar processing is performed on all platelets extracted from the image data, thereby calculating and storing contour data of the external form of each platelet and the internal structure included in the platelets such as the organelles (secretion granules, open small pipe systems, and the like).

In other words, in the platelet evaluation system according to the embodiment, a granules and deep stain granules which are platelet-specific organelles, and glycogen granules and mitochondria contained inside the platelets are collectively defined as a deep stain region, and contour data of the deep stain region is calculated and stored. In addition, contour data of the open small pipe system, which is an organelle specific to the same platelets, is also calculated and stored. Accordingly, three kinds of contour data of the platelet external form and the contour, the deep stain region, and the open small pipe system are calculated and stored, and the feature amount is calculated in step 303 using the calculated and stored contour data.

In order to perform the evaluation of platelets, there is no need to limit the contour extraction target to the platelet external form and the contour, the deep stain region, and the open small pipe system, and the alpha granules, the deep stain granules, glycogen granules, and mitochondria may be individually set as a contour extraction target, and organelles contained in other platelets such as dark small pipe systems and microtubules may also be set as contour extraction targets. In addition, cytoplasm, inclusion bodies, or sub-traits that are correlated with good or bad and/or functionality and quality of platelets may also be set as the contour extraction targets.

In addition, noise removal processing of an image may be performed for the purpose of improving accuracy of the contour extraction. Specifically, filter processing that improves the accuracy of the binarization processing and edge detection processing for the contour extraction to be described below is performed using known image processing techniques such as a median filter, a Gaussian filter, and a deconvolution filter. In addition, the filter processing may be executed in combination with image processing such as edge enhancement, binarization processing, contrast and brightness for the same purpose.

The contour extraction includes various known binarization methods, for example, a first derivative, a second derivative, and a pattern matching. A method different from that of the present embodiment may be used in accordance with the image data or the evaluation object, or an optimal method may be selected according to an evaluation object to be recognized by providing a user interface.

Next, the image analysis unit 104 calculates contour data of the external form of individual platelets and internal structures such as organelles included in platelets such as secretory granules and open small pipe systems calculated by contour extraction, and feature data illustrating morphological features such as an area, a diameter, and a peripheral length of each platelet (step 303).

The morphological features of the contour extraction target can be quantified using the contour data calculated and stored by contour extraction based on magnification data including a width of the visual field or a pixel size in a case of a digital image when the image is acquired. For example, when the contour extraction target is a platelet external form, information on sizes of the area, a diameter, a maximum diameter, a minimum diameter, a circumference, and the like of the platelet external form can be calculated as the feature amount.

In addition, in the platelet evaluation system according to the embodiment, an example in which platelets are observed using the scanning charged particle microscope 201 is shown. In the observation including the internal structure of a cell using the scanning charged particle microscope 201, a general method is used in which a cell sample is embedded in a resin, the resin is sliced into slices having a thickness of about several micrometers, and a cross-sectional image of the sliced sample is observed. Therefore, it is not possible to improve the accuracy of the cell evaluation only by the feature amount related to the size such as the diameter since, for example, the diameter of the cross-sectional image of a platelet found in the cross section of the sliced sample and the true diameter of the platelet are expected to be different from each other.

In step 303 executed by the image analysis unit 104 to solve this problem, in addition to the feature amount related to the size, as a feature amount that can evaluate the good or bad and/or functionality of the platelet even from the cross-sectional image of platelet, the morphology complexity, the area ratio and the degree of expansion of the open small pipe system, and the area ratio of the deep stain region are calculated and stored as feature data. Details of each feature amount will be described below.

Morphology Complexity

The "morphology complexity" is a feature amount that indicates roundness of the platelet external form. It is known that the platelet has a disc shape such as a disc in blood. As described above, since a platelet sample is prepared by slicing a resin in which platelets are embedded, it is expected that the cross section of the platelets to be observed is circular or elliptical. In addition, it is also known that platelets would have long protrusions when activated by external stimuli, which are entangled with each other and form an aggregate (thrombi). Therefore, it can be determined that a platelet that loses roundness and in a complicated form is in an activated state. As a medical platelet product, a state in which platelets are not activated is desirable.

The image analysis unit 104 calculates "morphology complexity" according to the following Equation (1).

$$\text{(morphology complexity)} = \text{(perimeter)}^2/\text{(area)} \tag{1}$$

Although the morphology complexity is calculated by Equation (1) in the embodiment, the morphology complexity may be quantitatively expressed by the roundness and complexity of platelets, for example, a degree of circularity or true circularity may also be used, and the morphology complexity may also be calculated by a combination of a perimeter length, an area, a diameter, or a gravity center position of the platelets and the like.

Area Ratio of Open Small Pipe System (OCS Area Ratio)

"OCS area ratio" is a feature amount indicating a proportion of the open small pipe system inside the platelets. It is known that the life of platelets collected from human blood is about 4 days, and an open small pipe system area of platelets near the end of life tends to increase. Therefore, by calculating the OCS area ratio, it is possible to calculate an increase condition of the open small pipe system, and to estimate whether the platelets are near the end of life.

The image analysis unit 104 calculates the "OCS area ratio" according to the following Equation (2).

$$\text{(OCS area ratio)} = \text{(total area of open small pipe system)}/\text{(area of platelet)} \tag{2}$$

Expansion Degree of Open Small Pipe System (OCS Expansion Degree)

The "OCS expansion degree" is a feature amount that indicates an expansion condition of the open small pipe system that is elongated and expanded in open small pipe systems inside the platelets. Even in a case where the area ratio of the open small pipe system described above is low, there is an elongated open small pipe system, and in a case where the maximum diameter of the open small pipe system exceeds 50% of a maximum diameter of the platelet external form, it is highly likely that a hemostatic ability of platelets is significantly reduced, which is shown by biochemical test results of the present inventors. Therefore, platelets having low hemostatic ability can be selected by calculating the OCS expansion degree.

The image analysis unit 104 calculates "OCS expansion degree" according to the following Equation (3).

$$\text{(OCS expansion degree)} = \text{(maximum diameter of open small pipe system)}/\text{(diameter of platelet)} \tag{3}$$

At this time, the "maximum diameter of the open small pipe system" adopts the largest value of maximum diameters of all open small pipe systems in the platelets.

In the embodiment, although the OCS expansion degree is calculated by the Equation (3), the OCS expansion degree may be quantitatively expressed by a expansion condition of the open tubular system inside the platelets, for example, the "diameter of platelet" may be changed into "maximum diameter of platelet", "maximum diameter of open small pipe system" may be changed into "maximum diameter of open small pipe system", and the definition formula is not limited to Equation (3) as long as it indicates the expansion condition of the open small pipe system with respect to the platelet external form.

Here, the diameter of the platelets is a length of a largest line segment that connects two points on an outer periphery of the contour indicated by the contour data of the platelet and passes through the gravity center of the contour. Further, the minimum diameter is a length of a smallest line segment that connects two points on the outer periphery of the contour indicated by the contour data of the platelet and passes through the gravity center of the contour. The maximum diameter is a length of a long side of a rectangle which is a calculated smallest rectangle surrounding an entire contour indicated by the contour data. For a diameter, although a value of the diameter is calculated using the gravity center of the contour, an effective measurement value may not be obtained when the gravity center is outside the contour. Accordingly, in a case where size information of the open small pipe system is obtained, the expansion condition of the open small pipe system can be relatively accurately quantified by using the maximum diameter acquired by using a circumscribed quadrangle (smallest rectangle surrounding the entire contour).

Area Ratio of Deep Stain Region (Deep Stain Region Area Ratio)

The "deep stain region area ratio" is a feature amount indicating a proportion of the deep stain region inside the platelets. As described above, the deep stain region contains chemicals (secretions) that are closely related to platelet haemostatic mechanisms such as alpha granules and deep stain granules. Therefore, if the deep stain region area ratio exhibits a low value such as 0%, 1%, 2%, 3%, 4%, and 5%, the platelets can be estimated to have a low hemostatic ability.

The image analysis unit 104 calculates the "deep stain region area ratio" according to the following Equation (4).

$$\text{(deep stain region area ratio)} = \text{(total area of deep stain region)}/\text{(area of platelet)} \tag{4}$$

The components of the deep stain region defined for performing the evaluation of platelets are not necessarily limited to a granules, deep stain granules, glycogen granules and mitochondria, and may include at least one or more cell small pipe system that contains secretions associated with the hemostatic mechanism. In addition, cytoplasm, inclusion bodies, or sub-traits that are correlated with good or bad and/or functionality and quality of other platelets may be defined instead of the deep stain region, and the area ratio thereof may be calculated.

Further, in accordance with the evaluation object and items to be classified, other than feature amounts described above, a feature amount such as the number of platelets themselves, or the number of secretory granules or the open small pipe systems inside the platelets may also be used. In addition, the user himself/herself may also add a feature amount such as morphology complexity, according to a combination including a selection unit of information that relates to a size that can be calculated from contour data such as an area, a diameter, a maximum diameter, a minimum diameter, and a peripheral length, and an input unit that can select operators such as arithmetic operations and an item that is a target of size information such as the open small pipe system or the deep stain region. Accordingly, the user can arbitrarily search for a feature amount determined based on knowledge and experience based on the feature amount derived from the size information even when the evaluation object is changed.

When step 303 ends, the feature amount and the image calculated by the image analysis unit 104 are displayed on the feature amount display unit 105 and the image display unit 103 respectively (step 304). In the schematic configuration block diagram of the platelet evaluation system of FIG. 1, although the image display unit 103 and the feature amount display unit 105 are illustrated by separate blocks similarly to the extraction and sorting processing result display unit 108, the user separation result display unit 110, and the automatic classification result display unit 113, various display units serving as user interfaces may also include a plurality of windows displayed on a display unit of the computer such as a PC described above at the same time or in a switching manner.

FIGS. 5 and 6 are schematic views illustrating an example of a user interface of the platelet evaluation program according to the embodiment. The configuration, function, and operation of the display method of the platelet evaluation system according to the embodiment will be described with reference to the drawings.

The display method may be in a form of a table 504 that displays a feature amount and a classification result as in a user interface 501 of the platelet evaluation program, or may be in a form of a panel 602 in which images are arranged as in a user interface 601. The table 504 of FIG. 5 has an advantage that feature amounts are viewed in a list, and the image size is generated as a thumbnail image or the like and displayed in a small region. However, in order to improve visibility of the image, a corresponding image is enlarged and displayed as 505 by clicking on a row. The panel 602 of FIG. 6 has an advantage that the images are viewed in a list, and thus it is desirable to hide various features. When a mouse cursor is placed on the image, individual feature amounts are displayed in a pop-up 605 or the like.

In this manner, by providing two kinds of display methods of a table of feature amounts and a panel display of images, the user can selectively use the evaluation focusing on the feature amount and a comprehensive evaluation seen from the image. For example, by displaying in the form of the panel 602 and displaying a certain amount of images in the form of the table 504, the user can easily recognize whether the good or bad and/or functionality and quality is determined and classified from a certain feature amount of the platelet image and whether the classification destination is determined. In the panel 602, in order to make the selected image easy to see, the background color may be changed and displayed as in a background color change region 603. In the flowchart of the embodiment shown in FIG. 3, the image display and the feature amount display are performed simultaneously (step 304), and may be displayed immediately after the image input and immediately after the image analysis.

In the extraction and sorting condition input unit 106 of the platelet evaluation system of the embodiment shown in FIG. 1, the user interface of the platelet evaluation program shown in FIG. 5 includes a combination of an interface 506 that can specify at least one arbitrary feature amount and an interface 507 indicating a value range of the feature amount, and an interface 508 that instructs execution timing of extraction. In addition, an interface 509 that issues an instruction to sort display data based on not only the extraction but also the feature amount is provided. By using the interface 509, the display data can be sorted in ascending order and descending order by clicking on a column title of the table 504 as shown in FIG. 5. Although a column title is used in FIG. 5, a combination of an interface that is capable of designating an arbitrary form feature amount and an interface that instructs a sort rule such as ascending order or descending order may be used for sorting.

In the configuration of the embodiment, the extraction and sorting processing unit 107 of the analysis classification unit receives the conditions input from the extraction and sorting condition input unit 106, that is, orders of the interface 508 that instructs execution timing of extraction or the interface 509 that gives an instruction of sorting execution, reads an input value of the interface 506 that can specify an arbitrary feature amount and the interface 507 that indicates the value range of the feature amount, and executes extraction and sort processing. For example, in the example shown in FIG. 5, a maximum diameter within a range of being equal to or more than 1 to being equal to or less than 2, and an area within a range of being equal to or more than 1.5 to being equal to or less than 3 are extracted. The extraction result is displayed on the extraction and sorting processing result display unit 108.

As described above, by classifying a certain degree of image, displaying it in a form of the table 504 and performing sort processing, it is easy for a user to recognize which threshold value of which feature amount the classified result is determined based on. For example, as shown in FIG. 12A, although the tendency of the feature amount sorted by the area is not seen, it can be easily recognized that the expansion degree of the open small pipe system is classified with a threshold value of 0.4 when sorting with the open small pipe system expansion degree as shown in FIG. 12B.

Furthermore, in the configuration of the embodiment, the extraction and sorting processing result display unit 108 complements visibility in a limited display area by redrawing the region of the table 504 or the panel 602 for the purpose of reducing the number of windows. The results may be individually displayed in a plurality of windows for the purpose of changing the extraction and sorting conditions and evaluating the results side by side.

In addition, in the extraction, highlight may be performed on the display screen as shown in FIGS. 7 and 8, so as to indicate where the extracted feature amount corresponds on the image. FIG. 7 shows a display screen displaying an example of a cross-sectional image and feature amounts of platelets to be evaluated by the platelet evaluation system of the embodiment, in which the displayed platelets have the same shape as those shown in FIGS. 5 and 6. In FIG. 7, the width and the height of the platelets are on the upper left, the maximum diameter and the minimum diameter of the platelets are on the lower left, the maximum diameter of the open small pipe system is on the upper right, and the area of the platelet, the area of the open small pipe system, and the area of the deep stain region are shown on the lower right.

An arrow 801 in FIG. 8 is a highlight to indicate which place the parameter of the maximum diameter of the platelets and the parameter of the expansion degree of the open small pipe system correspond to, and corresponds to the maximum diameters of the platelets and the open small pipe systems of FIG. 7. Accordingly, the user can intuitively recognize a place of the image based on which the number of the feature amount is calculated. A pop-up message 802, which is another highlight in FIG. 8, will be described below.

The extraction and the sort processing may be performed not only on the feature amount but also on the classification result. Accordingly, the user can manage unclassified and classified items separately, and it is easy to narrow down the range to a part of classification destinations and perform reconfirmation and reclassification.

The user inputs the classification destination to the user classification input unit 109 while viewing the analysis result or the extraction and sorting result displayed on the table 504 of FIG. 5 or the panel 602 of FIG. 6. If the user classification input unit 109 can directly input the classification destination to the corresponding cell in the table 504 as in the classification input interface 510, the user classification input unit 109 may select a plurality of lines or images in the table 504 or the panel 602 and classify the plurality of lines or images at a time according to the input value of the classification destination selection interface 604. In the panel 602, a plurality of lines or images can be selected by performing an operation such as a drag operation of a mouse or tracing with a touch panel. At this time, a background color and a frame color are displayed as the changed background color change area 603 so that a selected row or a selected image can be seen. It is only necessary to know that it is selected, and an interface for checking may be provided in a part of the selected row or the selected image. Accordingly, the user does not need to classify the plurality of pieces of platelet image data one by one, and classification can be performed efficiently.

In addition, in the configuration of the embodiment shown in FIG. 5, it is also possible to perform classification efficiently at the same time with extraction by providing the interface 511 configured to input a threshold for classification and the interface 512 that instructs the execution of the classification at the same time as the extraction. In the example shown in FIG. 5, since the threshold is equal to or more than 2, the platelet whose image having both the area and the maximum diameter ratio within the range is classified as OK. For example, the user can clearly classify what can be classified by the threshold value by using the user interface 501, and then perform extraction and sort processing to narrow down the range, and then use the user interface 601 to comprehensively determine the range, so that the classification can be performed efficiently (step 305). When the extraction and classification are executed at the same time, re-drawing based on extraction may be performed, or only the update of the automatic classification result display unit 113 may be performed.

In addition, the user classification input unit 109 may include not only an input unit that specifies a classification destination but also an interface configured to input a reason to be a classification destination. Since the user classification result display unit 110 may display the value input to the user classification input unit 109, the user classification result display unit 110 is shared with the classification input interface 510. In addition, when the classification is determined from the feature amount, the classification result is highlighted in frames 503 and 606 for each feature amount, and the classification is classified by a straight line, a dotted line, a broken line, or the like. Accordingly, it is easy for the user to recognize the tendency of the classification result for each feature amount. The classification result may be expressed by a difference background color instead of a frame line, or may be represented by adding a column of classification determination result or a mark at one corner of the cell for each feature amount.

The classification model creating unit 111 of the analysis classification unit creates a classification model based on the teacher data classified by the execution of the flowchart described above in detail (306). The classification model generation unit 111 may generate a classification tree according to the classification tree (T901 to T909) as illustrated in FIG. 9 according to machine learning, or may also be a multilayer network type classifier such as a neural network. A classifier using deep learning that requires teacher data may also be used. In addition, an image, a feature amount and a classification result stored in the image analysis unit 104 for the purpose of re-editing or reuse, a storage unit that stores the classification model created by the classification model creating unit 111, or a storage area may also be used.

<Final Evaluation of Platelets in Platelet Evaluation System>

Next, an operation processing flow for final evaluation of platelets in the platelet evaluation system according to the first embodiment will be described with reference to the drawings.

FIG. 4 shows an example of an operational flowchart when the platelet evaluation system according to the embodiment is applied to final evaluation of platelets. The flow including acquiring an image by the image acquisition unit 100 and displaying the acquired image and the feature amount thereof is the same as that described up to step 304 of FIG. 3, and a description thereof is omitted (step 401).

The automatic classification unit 112 of the analysis classification unit of FIG. 1 uses the classification model created by the classification model creating unit 111 described above, and automatically classifies the platelets from various morphological features (step 402). The automatic classification result is displayed on the automatic classification result display unit 113. The automatic classification result display unit 113 displays the result in the same format as the above-described user classification result display unit 110 (step 403). In addition, as in the pop-up message 802 on the platelet image shown in FIG. 8, the classification result, the event cause leading to the classification result, and the future event indicated by the classification result are highlighted additionally. That is, the automatic classification result display unit 113 can highlight the feature amount based on the classification result of the automatic classification unit 112. When there is a feature amount that is closely related to the event cause, which place the feature amount corresponds to on the image may be highlighted with the arrow 801, as is described above.

Accordingly, it is possible for the user to determine by referring to the reason for the classification and the risk indicated by the classified result or the like. In addition, when the classification model is matured and the matching ratio is improved, the present system would be a support system that makes it possible even for a user having little experience to make determination at the same level as that of a user rich in experience. In addition, the present system may be used as a learning system for a beginner.

In addition, a calculation unit of the matching ratio of the evaluation of the classification model and the evaluation input by the user may be provided, and the matching ratio may be displayed as the determination accuracy. In addition, after the evaluation, receiver operating characteristic (ROC) curves 1001 and 1002 exemplified in FIG. 10 may be displayed as a determination material of the user, and the true positive rate, the false positive rate, and the like may also be displayed. Since the classification of each feature amount and the evaluation result may have a tendency, the matching ratio or the ROC curve may be associated with the classification result for each feature amount, and the above may be displayed for each feature amount. Accordingly, the user can determine the validity or the accuracy of the classification model by viewing the matching ratio or the ROC curve.

The matching ratio, the ROC curve, the feature amount, and the image use the extraction and sorting condition input unit 106, the extraction and sorting processing unit 107, and the extraction and sorting processing result display unit 108 in the same manner as described above (step 404), and the user performs classification in the same manner as in the flow of FIG. 3 while referring to the result (step 405).

In addition, the extraction and sorting processing may be not only performed on the feature amount but also on the classification result and the evaluation result. Accordingly, images evaluated as foreign matters or configuration objects other than platelets mixed in the manufacturing process are excluded in the extraction processing to narrow the range, so that it can be expected to shorten the evaluation time by the user. On the other hand, by extracting the foreign matters and evaluating the number of the foreign matters and the form of the foreign matters, it is easy to perform feedback that there are some problems in the machine of the manufacturing process.

The user classification result display unit 110 displays results in the same manner as the above-described automatic classification result display unit 113. A plurality of frames 503 and 606 may be displayed so that both the user classification result and the automatic classification result can be seen, or the type of the frames may be determined by a combination of the user classification result and the automatic classification result. In addition, the user classification input unit 109 may be the same as the user classification result display unit 110 or the automatic classification result display unit 113, or may also be displayed on an individual interface.

As shown in a work support user interface 1101 of FIG. 11, by displaying the user classification result and the automatic classification result side by side, the user can easily recognize a place erroneously classified by the classification model, an appropriate threshold can be considered at the same time, the support effect of the classification model creation work can be obtained, and performance evaluation of the classification model becomes easier. That is, the user classification result display unit 110 and the automatic classification result display unit 113 are displayed side by side on the same screen.

In the example shown in FIG. 11, it can be seen that the classification model classifies the quality of the platelets by providing a threshold on the area, and the threshold is between 10 and 12, for example, 11. However, when the user views the classification result, it can be seen that the user tends to classify those having an area of 8 or less as OK, and 10 or more as NG. Therefore, the classification accuracy may be improved by changing the threshold value on the area of the classification model from 11 to 9, for example. In this way, the user can discuss the validity, accuracy, and improvement points of each classification model by displaying each classification result side by side on the display unit. Further, an interface where the user can input a recognized threshold value may be provided in the classification model creating unit 111 to appropriately correct the classification model.

In the case of a classification model such as a simple classification tree, the determination by the user as shown in FIG. 11 is easy, and the classification model can be expected to mature soon when the direct classification model is modified. However, even for the classification tree, when the condition is branched due to the combination of multiple conditions, or in a case of a complex classification model such as a neural network, the threshold cannot be determined by a simple extraction and sorting processing. In such a case, the user classification result may be passed to the classification model creating unit 111 again to improve the accuracy of the classification model.

A storage unit that collectively stores the image, the feature amount, the classification result, the used classification model, the evaluation result, and the final classification result may also be provided for the purpose of re-editing or reuse.

The invention is not limited to the embodiment described above and includes various modifications. For example, the embodiment described above has been described in detail for better understanding of the invention, and is not necessarily limited to including all the configurations described above. In addition, a part of the configuration of the embodiment can be replaced with another configuration, and another configuration can be added to the configuration of the embodiment.

Furthermore, although the above embodiment describes an example of creating a program for complementing a part or all of the above-described configurations, functions, control units, processing units, and the like, it is needless to say that a part or all of them may be complemented by hardware, for example, by designing an integrated circuit. In other words, all or a part of functions of the processing units may be complemented by an integrated circuit such as an Application Specific Integrated Circuit (ASIC) or a Field Programmable Gate Array (FPGA) instead of the program.

REFERENCE SIGN LIST 100 image acquisition unit
101 charged particle beam device
102 image input unit
103 image display unit
104 image analysis unit
105 feature amount display unit
106 extraction and sorting condition input unit
107 extraction and sorting processing unit
108 extraction and sorting processing result display unit
109 user classification input unit
110 user classification result display unit
111 classification model creating unit
112 automatic classification unit
113 automatic classification result display unit
121 processing unit
122 control unit
123 image generation unit
124 storage unit
125 input and output unit
201 scanning charged particle microscope
202 scanning charged particle gun
203 scanning charged particle beam
204 electron lens
205 sample
206 detector
207 stage
501, 601 user interface of platelet evaluation program
502 folder tree
503, 606 classification result display frame
504 table
505 image expansion display unit
506 interface that can specify arbitrary feature amount
507 interface that indicates value range of feature amount
508 interface that instructs execution of extraction processing
509 interface that instructs sorting execution
510 classification input interface 511 interface to input threshold for classification
512 interface that instructs to execute classification simultaneously with extraction
602 panel that displays feature amount, classification and evaluation result
603 background color change region
604 classification destination selection interface
605 feature amount displaying pop-up
700 cross section image of platelet
801 arrow
802 event cause, future event display
1001, 1002 ROC curve
1101 work support user interface

The invention claimed is:

1. An image classification device comprising:
an image input that acquires an image;
an image display that displays the acquired image;
an image analyzer that calculates a morphological feature amount from the image;
a feature amount display that displays the calculated feature amount;
an extraction and sorting condition input that specifies an extraction and sorting condition with regard to the feature amount;
an extraction and sorting processor that performs extraction and sorting processing of the feature amount based on the input condition;
an extraction and sorting processing result display that displays a processing result of the extraction and sorting processor;
a user classification input that allows a user to input a classification destination with regard to the image; and
a user classification result display that displays an input content from the user classification input, wherein
the image is a cross-sectional image of a cell,
the feature amount is a morphological feature amount of a contour of the cell and a feature amount of an internal structure included in an inner region of the contour,
the cell is a platelet, and
the morphological feature amount of the contour is a feature amount indicating roundness of a platelet external form, and the feature amount of the internal structure includes an area ratio of an open small pipe system of the platelet, an expansion degree of the open small pipe system, and an area ratio of a deep stain region of the platelet.

2. The image classification device according to claim 1, further comprising:
a classification model creator that creates an automatic classifier that classifies the image based on the processing result of the extraction and sorting processor.

3. The image classification device according to claim 2, further comprising:
an automatic classification result display that displays a classification result of the image classified by the automatic classifier.

4. The image classification device according to claim 3, wherein
the automatic classification result display highlights the feature amount based on the classification result of the automatic classifier.

5. The image classification device according to claim 3, wherein
the user classification result display and the automatic classification result display are displayed side by side on a same screen.

6. The image classification device according to claim 3, further comprising:
a calculation processor that calculates a matching ratio of the classification result of the automatic classifier and the input content input from the user classification input, wherein
the calculated matching ratio is displayed.

7. The image classification device according to claim 3, wherein
the user classification result display and the automatic classification result display are displayed side by side on the same screen.

8. The image classification device according to claim 2, wherein
the classification result display highlights the feature amount based on the classification result of the automatic classifier.

9. A display method of an image classification device including an analysis classifier and a display, wherein
the analysis classifier is configured to
calculate a morphological feature amount from an acquired image, and
perform extraction and sorting processing of the feature amount based on an extraction and sorting condition specified with regard to the calculated feature amount, and
the display is configured to
display the acquired image,
display the calculated feature amount,
display a processing result of the extraction and sorting processing of the feature amount, and
display an input content when a user inputs a classification destination with regard to the image, wherein
the image is a cross-sectional image of a cell,
the feature amount is a morphological feature amount of a contour of the cell and a feature amount of an internal structure included in an inner region of the contour,
the cell is a platelet, and
the morphological feature amount of the contour is a feature amount indicating roundness of a platelet external form, and the feature amount of the internal structure includes an area ratio of an open small pipe system of the platelet, an expansion degree of the open small pipe system, and an area ratio of a deep stain region of the platelet.

10. The display method according to claim 9, wherein
the analysis classifier is configured to
create an automatic classifier that classifies the image based on the processing result of the extraction and sorting processing of the feature amount.

11. The display method according to claim 10, wherein
the display is configured to
display an automatic classification result of the image classified by the automatic classifier.

12. The display method according to claim 11, wherein
the display is configured to
highlight the feature amount based on the automatic classification result of the automatic classifier.

13. The display method according to claim 11, wherein
the display is configured to
display a user classification result and the automatic classification result side by side on the same screen.

14. A non-transitory computer-readable medium comprising instructions operable, when executed by an image classification device comprising an analysis classifier and a display, to:

calculate a morphological feature amount from an acquired image, perform extraction and sorting processing of the feature amount based on an extraction and sorting condition specified with regard to the calculated feature amount, display the acquired image, display the calculated feature amount, display a processing result of the extraction and sorting processing of the feature amount, and display an input content when a user inputs a classification destination with regard to the image, wherein the image is a cross-sectional image of a cell, the feature amount is a morphological feature amount of a contour of the cell and a feature amount of an internal structure included in an inner region of the contour, the cell is a platelet, and the morphological feature amount of the contour is a feature amount indicating roundness of a platelet external form, and the feature amount of the internal structure includes an area ratio of an open small pipe system of the platelet, an expansion degree of the open small pipe system, and an area ratio of a deep stain region of the platelet.

15. The medium according to claim 14, further comprising instructions operable to:

create an automatic classifier that classifies the image based on the processing result of the extraction and sorting processing of the feature amount.

16. The medium according to claim 15, further comprising instructions operable to:

display an automatic classification result of the image classified by the automatic classifier.

17. The medium according to claim 16, further comprising instructions operable to:

highlight the feature amount based on the automatic classification result of the automatic classifier.

18. The medium according to claim 16, further comprising instructions operable to:

display a user classification result and the automatic classification result side by side on a same screen.

* * * * *